(12) United States Patent
Wu (10) Patent No.: US 11,275,627 B2
(45) Date of Patent: Mar. 15, 2022

(54) METHOD AND DEVICE FOR REPLACING INSECTICIDE COMPONENT, AND STORAGE MEDIUM

(71) Applicant: Beijing Xiaomi Mobile Software Co., Ltd., Beijing (CN)

(72) Inventor: Ke Wu, Beijing (CN)

(73) Assignee: Beijing Xiaomi Mobile Software Co., Ltd., Beijing (JP)

( * ) Notice: Subject to any disclaimer, the term of this patent is extended or adjusted under 35 U.S.C. 154(b) by 562 days.

(21) Appl. No.: 16/209,621

(22) Filed: Dec. 4, 2018

(65) Prior Publication Data

US 2019/0179683 A1 Jun. 13, 2019

(30) Foreign Application Priority Data

Dec. 7, 2017 (CN) .......................... 201711288982.9

(51) Int. Cl.
*G06F 9/54* (2006.01)
*A01M 1/02* (2006.01)
(Continued)

(52) U.S. Cl.
CPC ............ *G06F 9/542* (2013.01); *A01M 1/026* (2013.01); *A01M 7/0089* (2013.01); *G06F 16/2458* (2019.01); *A01M 2200/012* (2013.01)

(58) Field of Classification Search
CPC .. H04L 29/06; H04L 29/08072; A01M 1/245; A01M 2200/011
(Continued)

(56) References Cited

U.S. PATENT DOCUMENTS

| 5,396,729 A | 3/1995 | Vejvoda |
| 7,779,575 B2 * | 8/2010 | Hirafuji ............... A01M 1/026 43/112 |

(Continued)

FOREIGN PATENT DOCUMENTS

| CN | 105848478 A | 8/2016 |
| CN | 106614460 A | 5/2017 |

(Continued)

OTHER PUBLICATIONS

Extended European Search Report dated May 14, 2019 in corresponding European Patent Application No. 18209243.7, 7 pages.
(Continued)

*Primary Examiner* — Andy Ho
(74) *Attorney, Agent, or Firm* — Oblon, McClelland, Maier & Neustadt, L.L.P.

(57) ABSTRACT

The present disclosure relates to a method and a device for replacing an insecticide component, and a storage medium. The method includes acquiring historical distribution information at a location of an insect exterminator device that includes comprising the insecticide component, wherein the historical distribution information includes a set of distribution densities of insects collected within a preset time period; determining a serviceable time period of the insecticide component of the insect exterminator device based on the distribution information of insects and a preset capacity for the insect exterminator device to deal with insects; acquiring a serving time period of the insecticide component; determining a remaining time period based on the serviceable time period and the serving time period; and generating prompt information for replacing the insecticide component when the remaining time period is less than or equal to a threshold time period.

9 Claims, 8 Drawing Sheets

(51) Int. Cl.
*G06F 16/2458* (2019.01)
*A01M 7/00* (2006.01)

(58) Field of Classification Search
USPC .................. 43/132.1, 900; 709/217, 219
See application file for complete search history.

(56) References Cited

U.S. PATENT DOCUMENTS

| | | | |
|---|---|---|---|
| 8,994,529 B2 * | 3/2015 | White | A01M 1/2022 340/540 |
| 2002/0062205 A1 | 5/2002 | Roberts | |
| 2003/0213161 A1 | 11/2003 | Gardner, Jr. et al. | |
| 2005/0143959 A1 | 6/2005 | Roberts | |
| 2006/0149509 A1 | 7/2006 | Chyun | |
| 2009/0192763 A1 | 7/2009 | Gardner, Jr. et al. | |
| 2010/0312403 A1 | 12/2010 | White | |
| 2015/0157003 A1 | 6/2015 | White | |

FOREIGN PATENT DOCUMENTS

| | | |
|---|---|---|
| CN | 106682994 A | 5/2017 |
| CN | 107041349 A | 8/2017 |
| EP | 2 892 331 A1 | 7/2015 |
| JP | 2012-23966 A | 2/2012 |
| JP | 2016-181204 A | 10/2016 |
| WO | WO 02/17119 A2 | 2/2002 |
| WO | WO 03/084320 A1 | 10/2003 |
| WO | WO 2004/021735 A1 | 3/2004 |
| WO | WO 2014/037936 A1 | 3/2014 |

OTHER PUBLICATIONS

Combined Chinese Office Action and Search Report dated Jun. 29, 2020 in corresponding Chinese Patent Application No. 201711288982.9, (with English Translation of Category of Cited Documents), 7 pages.

Liu Xiao-qing et al., "Research on the growth and decay of mosquito density and its species forming by two methods", Chin J Hyg Insect &Equip, vol. 14 No. 4, Aug. 14, 2008, pp. 262-265.

Emmanuel Hakizimana et al., "Monitoring long-lasting insecticidal net (LLIN) durability to validate net serviceable life assumptions, in Rwanda", Malaria Journal 2014, 13:344, pp. 1-8.

* cited by examiner

METHOD AND DEVICE FOR REPLACING INSECTICIDE COMPONENT, AND STORAGE MEDIUM

CROSS-REFERENCE TO RELATED APPLICATIONS

This application is based upon and claims priority to Chinese Patent Application No. 201711288982.9, filed on Dec. 7, 2017, the entire contents of which are incorporated herein by reference.

TECHNICAL FIELD

The present disclosure relates to the field of communication, and more particularly, to a method and a device for replacing an insecticide component, and a storage medium.

BACKGROUND

With the development of science and technology, more and more insect exterminators are used to eliminate mosquitoes and insects. Insect exterminators kill insects through insecticide components such as electric mosquito liquids, electric mosquito tablets, and power grids. When the serving time or the number of mosquitoes killed reaches a certain level, the insecticide components need to be periodically replaced. At present, the user chooses to perform the replacement based on the user's visual inspection or empirical estimation. Therefore, the estimation is inaccurate and the insecticide components may be replaced too early or too late.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for replacing an insecticide component. The method includes acquiring historical distribution information at a location of an insect exterminator device that includes comprising the insecticide component, wherein the historical distribution information includes a set of distribution densities of insects collected within a preset time period; determining a serviceable time period of the insecticide component of the insect exterminator device based on the distribution information of insects and a preset capacity for the insect exterminator device to deal with insects; acquiring a serving time period of the insecticide component; determining a remaining time period based on the serviceable time period and the serving time period; and generating prompt information for replacing the insecticide component when the remaining time period is less than or equal to a threshold time period.

According to an aspect, when determining the serviceable time period, the method further includes estimating a density of insects at the location based on the historical distribution information; and determining the serviceable time period based on the density of the insects and the preset capacity.

According to another aspect, when acquiring the historical distribution information, the method further includes acquiring the historical distribution information from the insect exterminator device.

According to yet another aspect, when acquiring the historical distribution information, the method further includes acquiring environmental information of the location, the environmental information including an address of the location, a height of the location, and environment of the location; sending to a server a distribution request for requesting the historical distribution information, the distribution request including the environmental information; and receiving the historical distribution information sent by the server.

Aspects of the disclosure also provide a device for replacing an insecticide component. The device includes a processor and a memory for storing instructions executable by the processor. The processor is configured to acquire historical distribution information at a location of an insect exterminator device that includes the insecticide component, wherein the historical distribution information includes a set of distribution densities of insects collected within a preset time period; determine a serviceable time period of an insecticide component of the insect exterminator device based on the distribution information of insects and a preset capacity for the insect exterminator device to deal with insects; acquire a serving time period of the insecticide component; determine a remaining time period based on the serviceable time period and the serving time period; and generate prompt information for replacing the insecticide component when the remaining time period is less than or equal to a threshold time period.

Aspects of the disclosure also provide a non-transitory computer-readable medium storing instructions that, when executed by one or more processors of a device, cause the device to acquire historical distribution information at a location of an insect exterminator device that includes the insecticide component, wherein the historical distribution information includes a set of distribution densities of insects collected within a preset time period; determine a serviceable time period of an insecticide component of the insect exterminator device based on the distribution information of insects and a preset capacity for the insect exterminator device to deal with insects; acquire a serving time period of the insecticide component; determine a remaining time period based on the serviceable time period and the serving time period; and generate prompt information for replacing the insecticide component when the remaining time period is less than or equal to a threshold time period.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the disclosure. Instead, they are merely examples of apparatuses and methods consistent with aspects related to the disclosure as recited in the appended claims.

Figure 1:
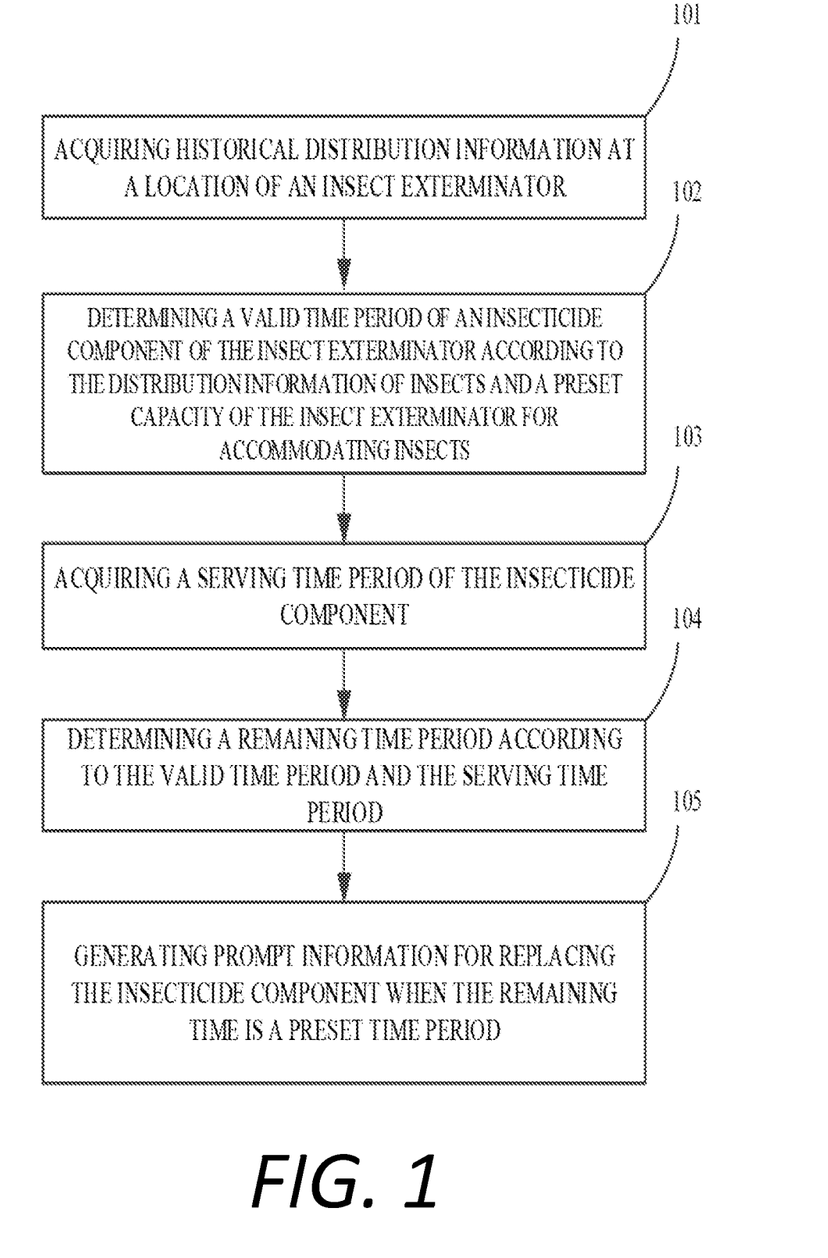
FIG. 1 is a flowchart illustrating a method for replacing an insecticide component according to an exemplary aspect of the present disclosure.

FIG. 1 is a flowchart illustrating a method for replacing an insecticide component according to an exemplary aspect. As shown in FIG. 1, the method for replacing an insecticide component is applied in a device for replacing the insecticide component, and the device is applied to an insect exterminator or a terminal. The method may include the following steps 101-104.

In step 101, historical distribution information at a location of an insect exterminator is acquired.

The historical distribution information includes a set of distribution densities of insects collected within a preset period of time. The distribution information may include a density of insects at the location. The preset time period is a time period from t1 to t2, where t2 is the current time and t1 is a time before t2. For example, t2 is Dec. 1, 2017, and t1 is Nov. 18, 2017.

In step 102, a serviceable time period of an insecticide component of the insect exterminator is determined according to the distribution information of insects and a preset capacity for the insect exterminator to deal with insects.

The insecticide component is an item consumed during an insect killing process, such as insecticidal fluid, insecticidal spray, insecticidal power grid, and the like. The serviceable time period is the maximum time period for which the insecticide component may be used from the time when the insecticide component was first put into use.

In step 103, a serving time period of the insecticide component is acquired.

The serving time period is a time period from the time when the insecticide component was first put into use to the current time.

In step 104, a remaining time period is determined according to the serviceable time period and the serving time period.

The remaining time period may be obtained by subtracting the serving time period from the serviceable time period.

In step 105, when the remaining time is less than or equal to a threshold time period, prompt information for replacing the insecticide component is generated.

Figure 2:
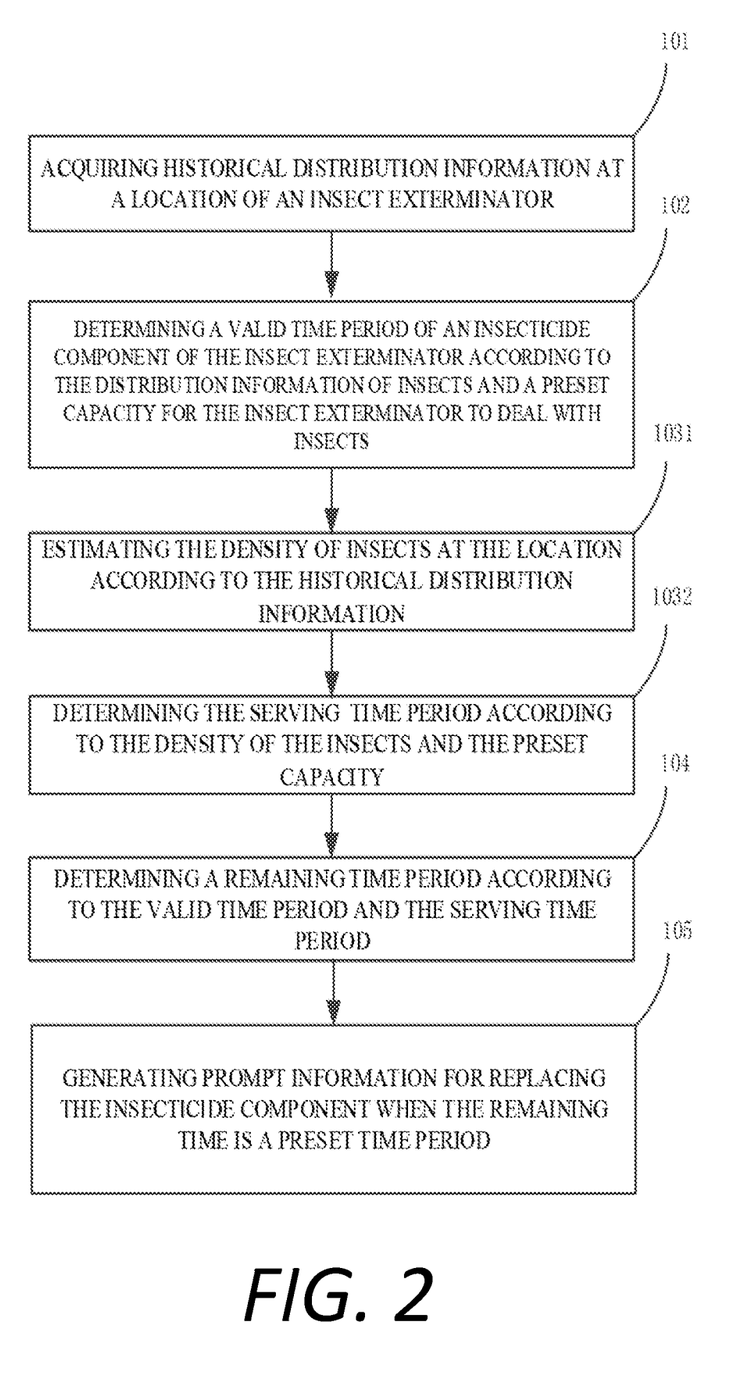
FIG. 2 is a flowchart illustrating a method for replacing an insecticide component according to an exemplary aspect of the present disclosure.

In one aspect, as shown in FIG. 2, step 103 in FIG. 1, that is, determining a serviceable time period of an insecticide component of the insect exterminator according to the distribution information of insects and a preset capacity for the insect exterminator to deal with insects, may include the following steps.

In step 1031, the density of insects at the location is estimated according to the historical distribution information.

Density here refers to the number of insects over time. The historical distribution information in this aspect may be the distribution information of insects on the current day, and the corresponding density of insects is the number of insects on the current day.

In step 1032, the serviceable time period is determined according to the density of the insects and the preset capacity.

The serviceable time period may be obtained by dividing the preset capacity by the density of the insects.

Figure 3:
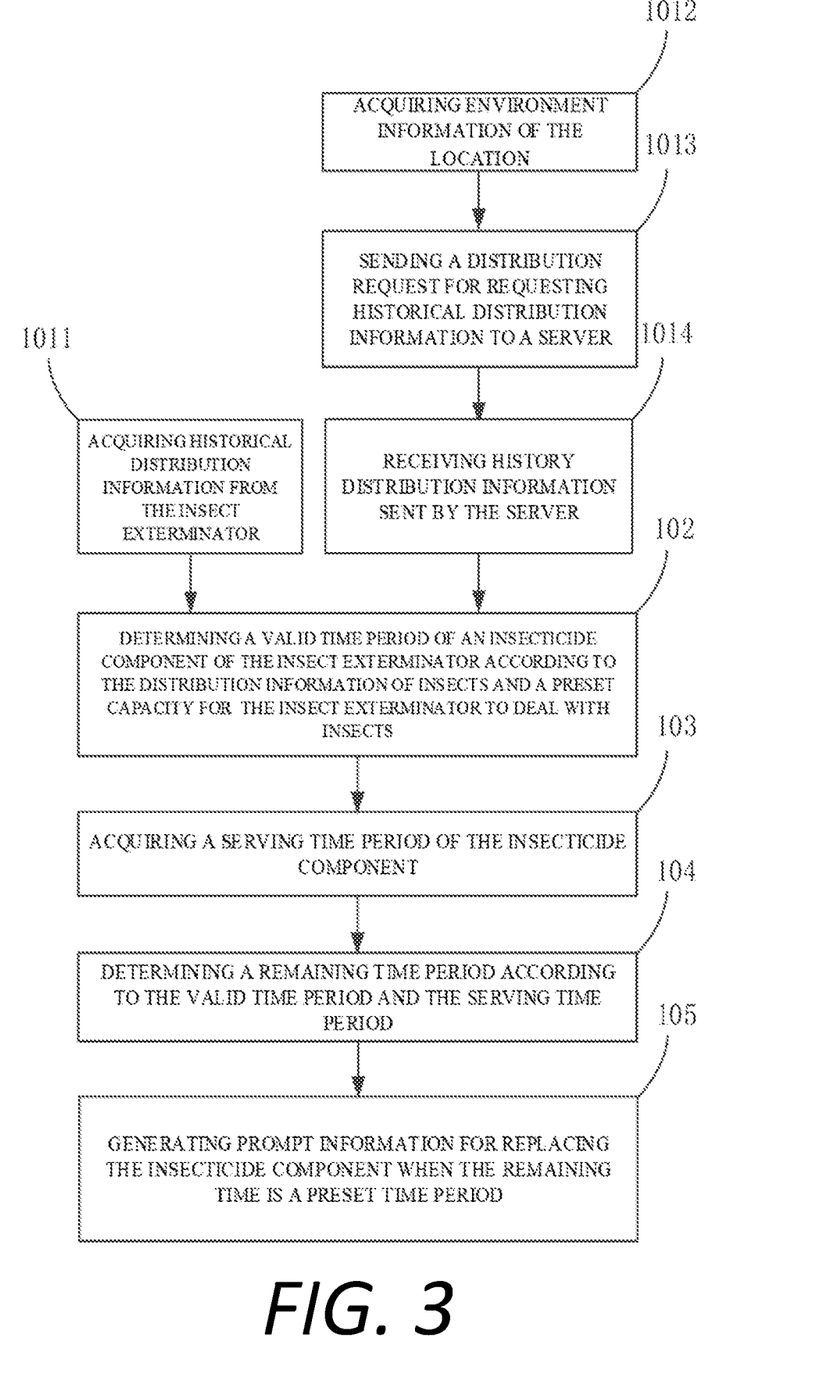
FIG. 3 is a flowchart illustrating a method for replacing an insecticide component according to an exemplary aspect of the present disclosure.

In one aspect, as shown in FIG. 3, step 101 in FIG. 1, that is, acquiring historical distribution information at a location of an insect exterminator may include the following steps.

In step 1011, historical distribution information is acquired from the insect exterminator.

If the insect exterminator does not move, the historical distribution information stored in the insect exterminator can be directly retrieved.

In step 1012, environment information of the location is acquired.

Environmental information includes an address, a height, and environment of the location.

If the location of the insect exterminator changes or the insect exterminator is a new insect exterminator, historical distribution information which was uploaded by another insect exterminator at that location may be acquired over network.

In step 1013, a distribution request for requesting historical distribution information is sent to a server.

The distribution request carries the environmental information.

In step 1014, history distribution information sent by the server is received.

Figure 4:
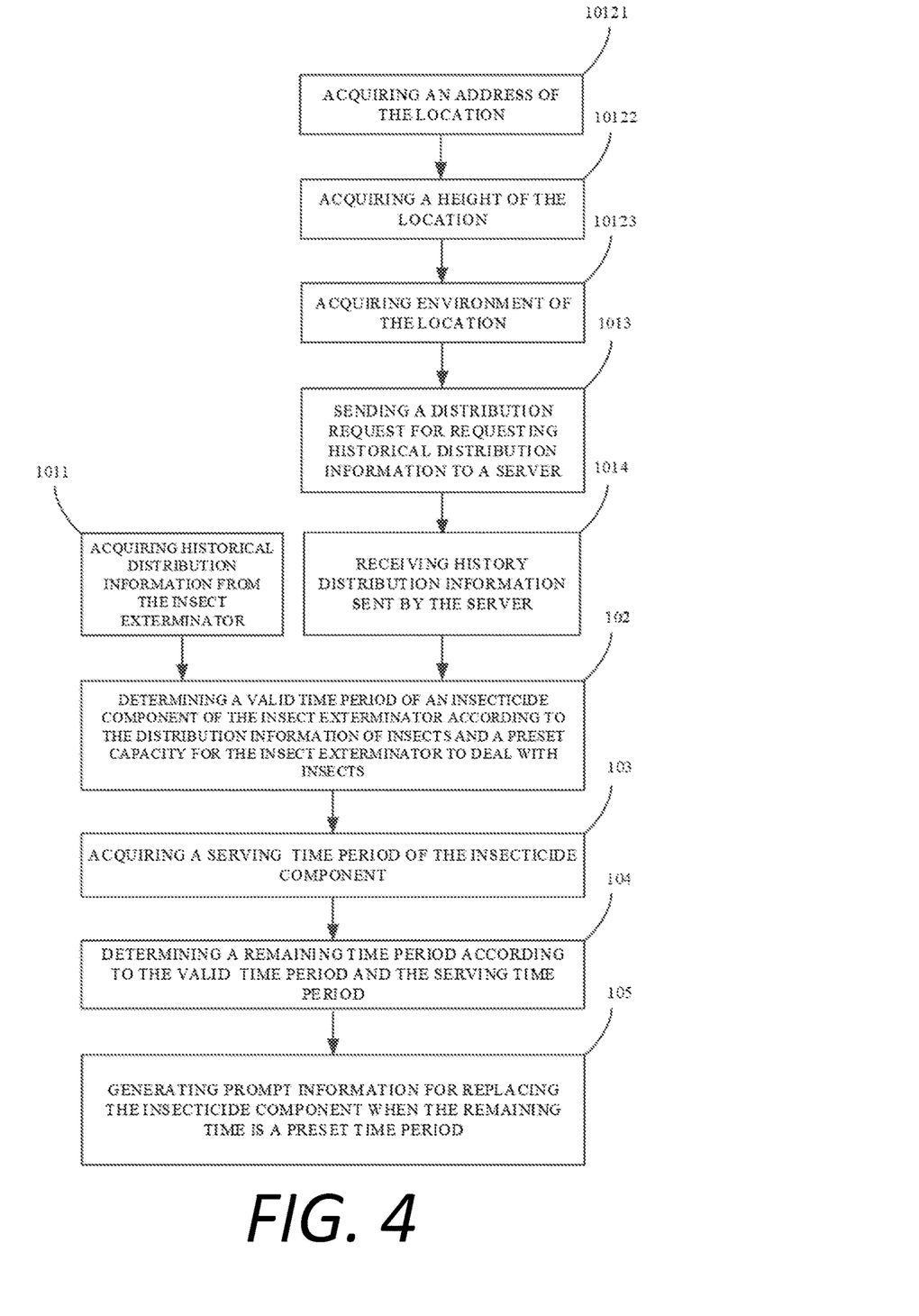
FIG. 4 is a flowchart illustrating a method for replacing an insecticide component according to an exemplary aspect of the present disclosure.

In one aspect, as shown in FIG. 4, step 1012 in FIG. 1, that is, acquiring geographical location information of the location includes the following steps.

In step 10121, an address of the location is acquired.

The address may be acquired through a global positioning system, Beidou navigation system and other positioning systems, inquired through the geographic home location of the user's mobile phone number and the area code of a telephone number, determined according to the WiFi hotspot to which the mobile phone connects, or through positioning via base station. Specifically, the terminal, when served by a base station of an operator, may determine the address by acquiring the location of the base station which the terminal is using. The address may also be determined through a delivery address for the online express delivery, the last delivery address, and the provided postal code. The address may also be determined according to an IP address of the Internet. The IP address is allocated according to geographic region, and thus it facilitates querying the geographic location corresponding to the IP. In addition, some IPs are fixedly allocated and will not change for a long time. It is also possible to locate according to the scenery, architecture, or symbolic objects in the user's recent photos. This aspect does not limit the positioning method.

In step 10122, a height of the location is acquired.

The height may be measured by a tool with altitude measurement feature; or may also be calculated based on a picture of reference building captured by a camera.

In step 10123, environment of the location is acquired.

The number of insects may also be different in different environment. For example, for a garden in a residential community and a basketball playground in the residential community, apparently, the garden has more insects than the basketball playground.

The method provided in this aspect can be applied not only to the insect exterminator but also to a terminal connected to the insect exterminator. The insect exterminator may be a mosquito exterminator.

The following is a device aspect of the present disclosure and may be used to perform the method aspects of the present disclosure.

Figure 5:
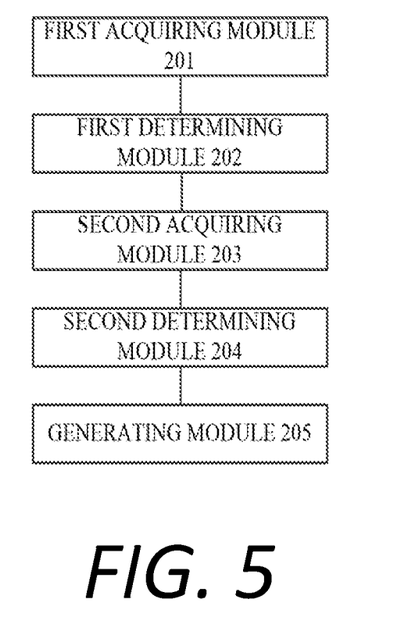
FIG. 5 is a block diagram illustrating a device for replacing an insecticide component according to an exemplary aspect of the present disclosure.

FIG. 5 is a block diagram illustrating a device for replacing an insecticide component according to an exemplary aspect. The device may be implemented as part or the entirety of an electronic device through software, hardware, or a combination thereof As shown in FIG. 5, the device for replacing an insecticide component includes:

a first acquiring module 201 configured to acquire historical distribution information at a location of an insect exterminator comprising the insecticide component, the historical distribution information including a set of distribution densities of insects collected within a preset period of time;

a first determining module 202 configured to determine a serviceable time period of an insecticide component of the insect exterminator according to the distribution information of insects and a preset capacity for the insect exterminator to deal with insects;

a second acquiring module 203 configured to acquire a serving time period of the insecticide component;

a second determining module 204 configured to determine a remaining time period according to the serviceable time period and the serving time period; and a generating module 205 configured to generate prompt information for replacing the insecticide component when the remaining time is less than or equal to a threshold time period.

Figure 6:
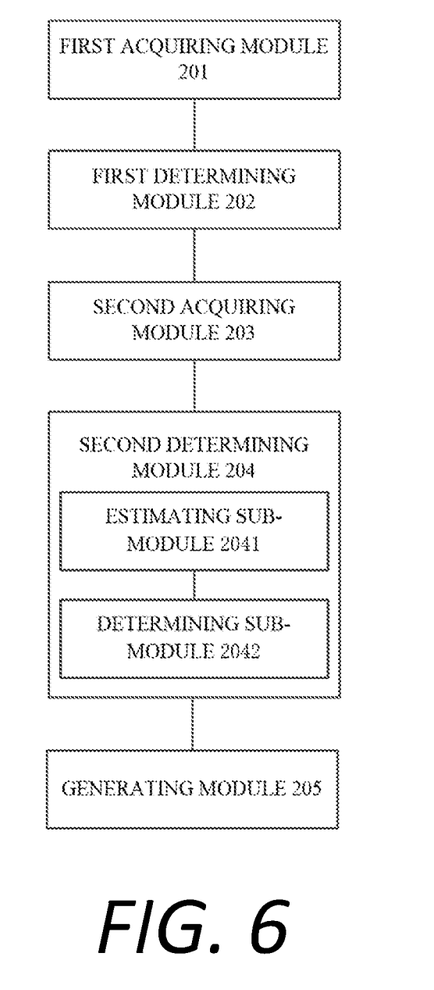
FIG. 6 is a block diagram illustrating a device for replacing an insecticide component according to an exemplary aspect of the present disclosure.

In one aspect, as shown in FIG. 6, the second determining module 204 includes:

an estimating sub-module 2041 configured to estimate the density of insects at the location according to the historical distribution information; and a determining sub-module 2042 configured to determine the serviceable time period according to the density of the insects and the preset capacity.

Figure 7:
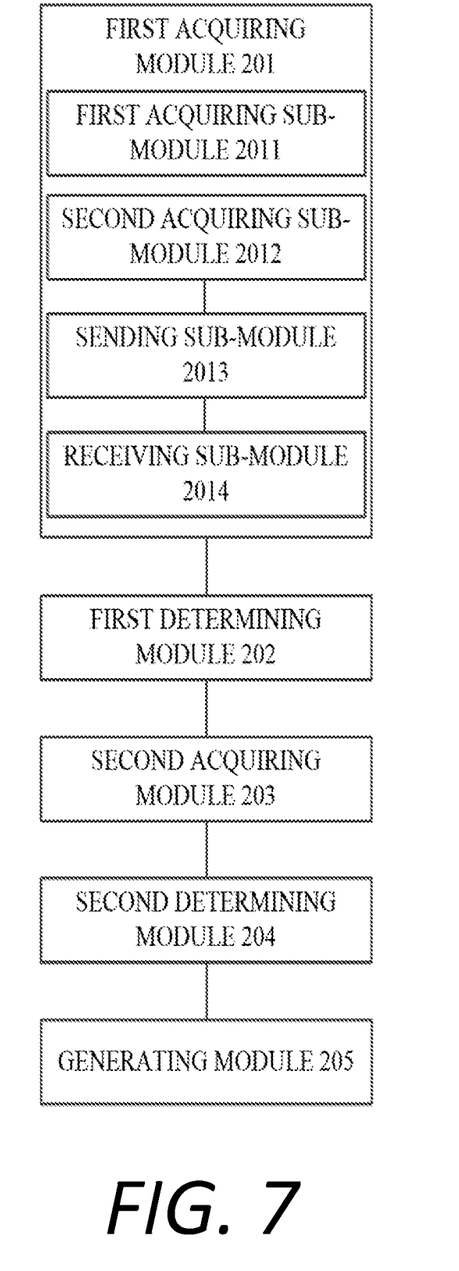
FIG. 7 is a block diagram illustrating a device for replacing an insecticide component according to an exemplary aspect of the present disclosure.

In one aspect, as shown in FIG. 7, the first acquiring module 201 includes:

a first acquiring sub-module 2011 configured to acquire historical distribution information from the insect exterminator; or a second acquiring sub-module 2012 configured to acquire environment information of the location, the environmental information including an address, a height, and environment of the location;

a sending sub-module 2013 configured to send to a server a distribution request for requesting historical distribution information, the distribution request carrying the environmental information; and a receiving sub-module 2014 configured to receive history distribution information sent by the server.

In one aspect, the second acquiring sub-module 2012 is configured to:

acquire an address of the location;

acquire a height of the location;

acquire environment of the location.

According to a third aspect of the aspects of the present disclosure, there is provided a device for replacing an insecticide component, including:

a processor; and a memory for storing instructions executable by the processor;

wherein the processor is configured to:

acquire historical distribution information at a location of an insect exterminator comprising the insecticide component, the historical distribution information including a set of distribution densities of insects collected within a preset period of time;

determine a serviceable time period of an insecticide component of the insect exterminator according to the distribution information of insects and a preset capacity for the insect exterminator to deal with insects;

acquire a serving time period of the insecticide component;

determine a remaining time period according to the serviceable time period and the serving time period; and generate prompt information for replacing the insecticide component when the remaining time is less than or equal to a threshold time period.

The processor may also be configured to:

determine a serviceable time period of an insecticide component of the insect exterminator according to the distribution information of insects and a preset capacity for the insect exterminator to deal with insects includes:

estimate the density of insects at the location according to the historical distribution information; and determine the serviceable time period according to the density of the insects and the preset capacity.

Acquiring historical distribution information at a location of an insect exterminator includes:

acquiring historical distribution information from the insect exterminator; or acquiring environment information of the location, the environmental information including an address, a height, and environment of the location; sending to a server a distribution request for requesting historical distribution information, the distribution request carrying the environmental information; and receiving history distribution information sent by the server.

Acquiring geographical location information of the location includes:

acquiring an address of the location;

acquiring a height of the location;

acquiring environment of the location.

With respect to the device in the above aspects, the specific manners for performing operations for individual modules therein have been described in detail in the aspects regarding the relevant methods, which will not be elaborated herein.

Figure 8:
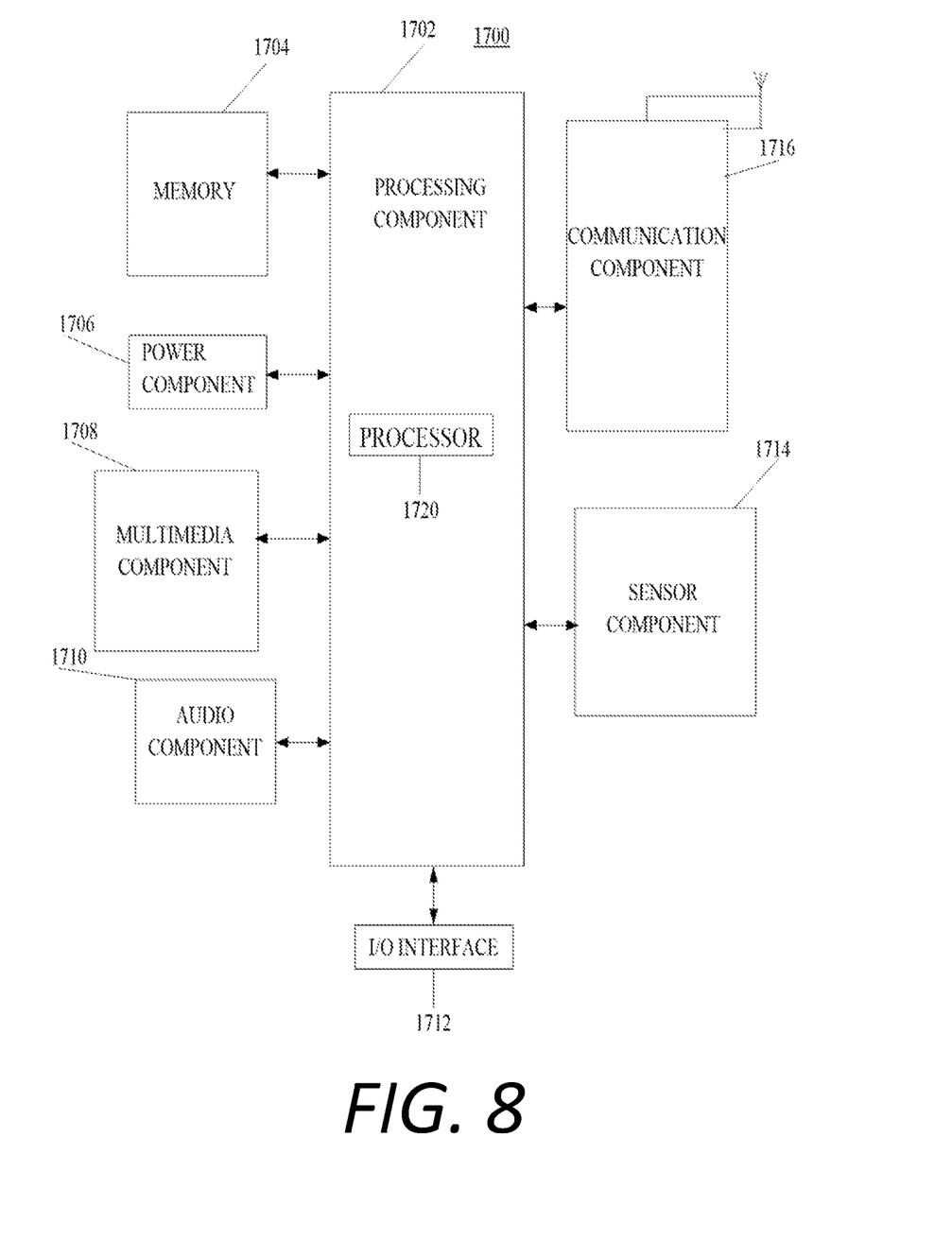
FIG. 8 is a block diagram illustrating a device for replacing an insecticide component according to an exemplary aspect of the present disclosure.

FIG. 8 is a block diagram illustrating a device for replacing an insecticide component according to an exemplary aspect. The device 1700 is applied in a terminal device. For example, the device 1700 may be a mobile phone, a computer, a digital broadcast terminal, a messaging device, a gaming console, a tablet, a medical device, exercise equipment, a personal digital assistant, and the like.

The device 1700 may include one or more of the following components: a processing component 1702, a memory 1704, a power component 1706, a multimedia component 1708, an audio component 1710, an input/output (I/O) interface 66, a sensor component 1714, and a communication component 1716.

The processing component 1702 typically controls overall operations of the device 1700, such as the operations associated with display, telephone calls, data communications, camera operations, and recording operations. The processing component 1702 may include one or more processors 1720 to execute instructions to perform all or part of the steps in the above described methods. Moreover, the processing component 1702 may include one or more modules which facilitate the interaction between the processing component 1702 and other components. For instance, the processing component 1702 may include a multimedia module to facilitate the interaction between the multimedia component 1708 and the processing component 1702.

The memory 1704 is configured to store various types of data to support the operation of the device 1700. Examples of such data include instructions for any applications or methods operated on the device 1700, contact data, phonebook data, messages, pictures, video, etc. The memory 1704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1706 provides power to various components of the device 1700. The power component 1706 may include a power management system, one or more power sources, and any other components associated with the generation, management, and distribution of power in the device 1700.

The multimedia component 1708 includes a screen providing an output interface between the device 1700 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some aspects, the multimedia component 1708 includes a front camera and/or a rear camera. The front camera and the rear camera may receive an external multimedia datum while the device 1700 is in an operation mode, such as a photographing mode or a video mode. Each of the front camera and the rear camera may be a fixed optical lens system or have focus and optical zoom capability.

The audio component 1710 is configured to output and/or input audio signals. For example, the audio component 1710 includes a microphone ("MIC") configured to receive an external audio signal when the device 1700 is in an operation mode, such as a call mode, a recording mode, and a voice recognition mode. The received audio signal may be further stored in the memory 1704 or transmitted via the communication component 1716. In some aspects, the audio component 1710 further includes a speaker to output audio signals.

The I/O interface 1712 provides an interface between the processing component 1702 and peripheral interface modules, such as a keyboard, a click wheel, buttons, and the like. The buttons may include, but are not limited to, a home button, a volume button, a starting button, and a locking button.

The sensor component 1714 includes one or more sensors to provide status assessments of various aspects of the device 1700. For instance, the sensor component 1714 may detect an open/closed status of the device 1700, relative positioning of components, e.g., the display and the keypad, of the device 1700, a change in position of the device 1700 or a component of the device 1700, a presence or absence of user contact with the device 1700, an orientation or an acceleration/deceleration of the device 1700, and a change in temperature of the device 1700. The sensor component 1714 may include a proximity sensor configured to detect the presence of nearby objects without any physical contact. The sensor component 1714 may also include a light sensor, such as a CMOS or CCD image sensor, for use in imaging applications. In some aspects, the sensor component 1714 may also include an accelerometer sensor, a gyroscope sensor, a magnetic sensor, a pressure sensor, or a temperature sensor.

The communication component 1716 is configured to facilitate communication, wired or wirelessly, between the device 1700 and other devices. The device 1700 can access a wireless network based on a communication standard, such as WiFi, 2G or 3G or a combination thereof. In one exemplary aspect, the communication component 1716 receives a broadcast signal or broadcast associated information from an external broadcast management system via a broadcast channel. In one exemplary aspect, the communication component 1716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary aspects, the device 1700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary aspects, there is also provided a non-transitory computer-readable storage medium including instructions, such as included in the memory 1704, executable by the processor 1720 in the device 1700, for performing the above methods. For example, the non-transitory computer-readable storage medium may be a ROM, a RAM, a CD-ROM, a magnetic tape, a floppy disc, an optical data storage device, and the like.

A non-transitory computer readable storage medium has instructions stored thereon. When the instructions in the storage medium are executed by the processor of the device 1700, the device 1700 is caused to perform the method for replacing an insecticide component. The method includes:

acquiring historical distribution information at a location of an insect exterminator, the historical distribution information including a set of distribution densities of insects collected within a preset period of time;

determining a serviceable time period of an insecticide component of the insect exterminator according to the distribution information of insects and a preset capacity for the insect exterminator to deal with insects;

acquiring a serving time period of the insecticide component;

determining a remaining time period according to the serviceable time period and the serving time period; and generating prompt information for replacing the insecticide component when the remaining time is less than or equal to a threshold time period.

Determining a serviceable time period of an insecticide component of the insect exterminator according to the distribution information of insects and a preset capacity for the insect exterminator to deal with insects includes:

estimating the density of insects at the location according to the historical distribution information; and determining the serviceable time period according to the density of the insects and the preset capacity.

Acquiring historical distribution information at a location of an insect exterminator includes:

acquiring historical distribution information from the insect exterminator; or acquiring environment information of the location, the environmental information including an address, a height, and environment of the location; sending to a server a distribution request for requesting historical distribution information, the distribution request carrying the environmental information; and receiving history distribution information sent by the server.

Acquiring geographical location information of the location includes:

acquiring an address of the location;
acquiring a height of the location;
acquiring environment of the location.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method for replacing an insecticide component, comprising:

acquiring historical distribution information at a location of an insect exterminator device that includes comprising the insecticide component, wherein the historical distribution information includes a set of distribution densities of insects collected within a preset time period;

determining a serviceable time period of the insecticide component of the insect exterminator device based on the distribution information of insects and a preset capacity for the insect exterminator device to deal with insects;

acquiring a serving time period of the insecticide component;

determining a remaining time period based on the serviceable time period and the serving time period; and generating prompt information for replacing the insecticide component when the remaining time period is less than or equal to a threshold time period, wherein acquiring the historical distribution information comprises:

acquiring environmental information of the location, the environmental information including an address of the location, a height of the location, and environment of the location;

sending to a server a distribution request for requesting the historical distribution information, the distribution request including the environmental information: and receiving the historical distribution information sent by the server.

2. The method according to claim 1, wherein determining the serviceable time period comprises:

estimating a density of insects at the location based on the historical distribution information; and determining the serviceable time period based on the density of the insects and the preset capacity.

3. The method according to claim 1, wherein acquiring the historical distribution information comprises:

acquiring the historical distribution information from the insect exterminator device.

4. A device for replacing an insecticide component, comprising:

a processor; and
a memory for storing instructions executable by the processor;
wherein the processor is configured to:

acquire historical distribution information at a location of an insect exterminator device that includes the insecticide component, wherein the historical distribution information includes a set of distribution densities of insects collected within a preset time period;

determine a serviceable time period of an insecticide component of the insect exterminator device based on the distribution information of insects and a preset capacity for the insect exterminator device to deal with insects;

acquire a serving time period of the insecticide component;

determine a remaining time period based on the serviceable time period and the serving time period; and generate prompt information for replacing the insecticide component when the remaining time period is less than or equal to a threshold time period, wherein when acquiring the historical distribution information, the processor is further configured to:

acquire environmental information of the location, the environmental information including an address of the location, a height of the location, and environment of the location;

send to a server a distribution request for requesting the historical distribution information, the distribution request including the environmental information; and receive the historical distribution information sent by the server.

5. The device according to claim 4, wherein, when determining the serviceable time period, the processor is further configured to:

estimate a density of insects at the location based on the historical distribution information; and determine the serviceable time period based on the density of the insects and the preset capacity.

6. The device according to claim 4, wherein, when acquiring the historical distribution information, the processor is further configured to:

acquire the historical distribution information from the insect exterminator device.

7. A non-transitory computer-readable medium storing instructions that, when executed by one or more processors of a device, cause the device to:

acquire historical distribution information at a location of an insect exterminator device that includes the insecticide component, wherein the historical distribution information includes a set of distribution densities of insects collected within a preset time period;

determine a serviceable time period of an insecticide component of the insect exterminator device based on the distribution information of insects and a preset capacity for the insect exterminator device to deal with insects;

acquire a serving time period of the insecticide component;

determine a remaining time period based on the serviceable time period and the serving time period; and generate prompt information for replacing the insecticide component when the remaining time period is less than or equal to a threshold time period, wherein when acquiring the historical distribution information, the instructions further cause the device is caused to:

acquire environmental information of the location, the environmental information including an address of the location, a height of the location, and environment of the location;

send to a server a distribution request for requesting the historical distribution information, the distribution request including the environmental information; and receive the historical distribution information sent by the server.

8. The non-transitory computer-readable medium according to claim 7, wherein, when determining the serviceable time period, the instructions further cause the device to:

estimate a density of insects at the location based on the historical distribution information; and determine the serviceable time period based on the density of the insects and the preset capacity.

9. The non-transitory computer-readable medium according to claim 7, wherein, when acquiring the historical distribution information, the instructions further cause the device to:

acquire the historical distribution information from the insect exterminator device.

* * * * *